(12) United States Patent
Fidaleo (10) Patent No.: US 12,333,257 B2
(45) Date of Patent: Jun. 17, 2025

(54) ENSURING USER DATA SECURITY WHILE PERSONALIZING A SOCIAL AGENT

(71) Applicant: Disney Enterprises, Inc., Burbank, CA (US)

(72) Inventor: Douglas A. Fidaleo, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 237 days.

(21) Appl. No.: 17/345,671

(22) Filed: Jun. 11, 2021

(65) Prior Publication Data

US 2022/0398385 A1    Dec. 15, 2022

(51) Int. Cl.
| | |
|---|---|
| *G06F 40/35* | (2020.01) |
| *G06F 21/62* | (2013.01) |
| *G06F 40/186* | (2020.01) |
| *G06N 5/04* | (2023.01) |

(52) U.S. Cl.
CPC .......... *G06F 40/35* (2020.01); *G06F 21/6245* (2013.01); *G06F 40/186* (2020.01); *G06N 5/04* (2013.01)

(58) Field of Classification Search
CPC .... G06F 40/35; G06F 21/6245; G06F 40/186; G06F 40/174; G06F 40/216; G06N 5/04
See application file for complete search history.

(56) References Cited

U.S. PATENT DOCUMENTS

| | | | | |
|---|---|---|---|---|
| 6,773,344 B1 * | 8/2004 | Gabai | ...................... | A63H 30/04 463/1 |
| 8,751,535 B1 * | 6/2014 | Kim | ...................... | G06F 21/6245 715/713 |
| 10,552,637 B1 * | 2/2020 | Phillips | ............. | G06F 16/90335 |
| 2005/0216126 A1 * | 9/2005 | Koselka | ................. | B25J 19/023 700/259 |
| 2006/0075228 A1 * | 4/2006 | Black | .................... | H04L 63/104 713/167 |

(Continued)

OTHER PUBLICATIONS

Hung, Patrick CK, et al. "A glance of child's play privacy in smart toys." Cloud Computing and Security: Second International Conference, ICCCS 2016, Nanjing, China, Jul. 29-31, 2016, Revised Selected Papers, Part II 2. Springer International Publishing, 2016, pp. 217-230 (Year: 2016).*

*Primary Examiner* — Jesse S Pullias
*Assistant Examiner* — Michael C. Lee
(74) *Attorney, Agent, or Firm* — Farjami & Farjami LLP (57) ABSTRACT

A social agent system includes a computing platform having processing hardware and a system memory storing a social agent software code. The processing hardware is configured to execute the social agent software code to receive, from a client system, input data provided by a user of the client system when the user is interacting with the social agent system using the client system, and to select, using the input data, a dialogue template for responding to the user. The dialogue template includes one or more placeholder fields to be filled by the client system to create a personalized dialogue for responding to the user. The processing hardware is further configured to execute the social agent software code to deliver, to the client system, the dialogue template including the one or more placeholder fields to be filled by the client system to create the personalized dialogue for responding to the user.

19 Claims, 6 Drawing Sheets

(56) References Cited

U.S. PATENT DOCUMENTS

| | | | |
|---|---|---|---|
| 2008/0040094 A1* | 2/2008 | Wolgemuth | G06F 40/58 704/2 |
| 2015/0278180 A1* | 10/2015 | Nicholas, Jr. | G06F 3/04883 715/230 |
| 2015/0336016 A1* | 11/2015 | Chaturvedi | A63H 30/04 446/484 |
| 2016/0206955 A1* | 7/2016 | Goslin | G06F 3/0346 |
| 2016/0300387 A1* | 10/2016 | Ziman | G06F 3/165 |
| 2016/0361663 A1* | 12/2016 | Watry | H04L 67/10 |
| 2018/0117479 A1* | 5/2018 | Coolidge | G09B 5/00 |
| 2018/0165596 A1* | 6/2018 | Abrams | G06N 5/04 |
| 2018/0165854 A1* | 6/2018 | Du | G06F 16/00 |
| 2018/0350118 A1* | 12/2018 | Bastaldo-Tsampalis | G06T 19/006 |
| 2019/0090712 A1* | 3/2019 | Cheong | A47L 11/4061 |
| 2019/0156222 A1* | 5/2019 | Emma | G06N 5/041 |
| 2019/0197396 A1* | 6/2019 | Rajkumar | G06N 3/08 |
| 2019/0362711 A1* | 11/2019 | Nosrati | G06F 17/18 |
| 2020/0213680 A1* | 7/2020 | Ingel | H04N 21/8106 |
| 2021/0352160 A1* | 11/2021 | Jackson | H04L 67/02 |
| 2022/0092270 A1* | 3/2022 | Scherer | G06F 40/35 |
| 2022/0270505 A1* | 8/2022 | Carmichael | G06Q 50/2057 |

\* cited by examiner

ENSURING USER DATA SECURITY WHILE PERSONALIZING A SOCIAL AGENT

BACKGROUND

A characteristic feature of human social interaction is personalization. For example, when two people interact repeatedly in a similar manner, such as greeting one another, a variety of different expressions may be used despite the fact that a generic "hello" would be adequate in almost every instance. Instead, a human speaker may select expressions for use in an interaction with another person based on whether that person is a child, a teenager, or an adult, as well as based on their personal history of interactions with the other person. In order for a non-human social agent to engage in a realistic interaction with a user, it is desirable that the social agent also be capable of varying its form of expression in a personalized and seemingly natural way.

Personalizing the responsiveness of a social agent during an interaction with a particular user has typically required the system providing the social agent to acquire and store user data as part of an overall user profile including demographic and geographic details describing the user, as well as a history of previous interactions with the user. However, concerns regarding personal privacy, data security, and liability for data breaches make it increasingly advantageous, for users and system administrators alike, to provide users with the ability to restrict access to their personal user data while continuing to enable use of such data to personalize their interactions with a social agent.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

As stated above, a characteristic feature of human social interaction is personalization. For example, and as also stated above, when two people interact repeatedly in a similar manner, such as greeting one another, a variety of different expressions may be used despite the fact that a generic "hello" would be adequate in almost every instance. Instead, a human speaker may select expressions for use in an interaction with another person based on whether that person is a child, a teenager, or an adult, as well as based on their personal history of interactions with the other person. In order for a non-human social agent to engage in a realistic interaction with a user, it is desirable that the social agent also be capable of varying its form of expression in a personalized and seemingly natural way. However, due to concerns regarding personal privacy, data security, and liability for data breaches, there is a need in the art for a data management solution that provides users with the ability to restrict access to their personal user data while continuing to enable use of such data to personalize their interactions with a social agent.

The present application is directed to automated systems and methods that address and overcome the deficiencies in the conventional art described above. The inventive concepts disclosed in the present application advantageously enable the automated determination of naturalistic expressions for use by a social agent in responding to an interaction with a user, while concurrently enabling the user to selectively sequester their personal user data from the system providing the social agent. It is noted that, as defined in the present application, the term "response" may refer to language based expressions, such as a statement or question, or to non-verbal expressions. Moreover, the term "non-verbal expression" may refer to vocalizations that are not language based, i.e., non-verbal vocalizations, as well as to physical gestures and postures. Examples of non-verbal vocalizations may include a sigh, a murmur of agreement or disagreement, or a giggle, to name a few.

As defined in the present application, the term "goal" refers to an aim or objective motivating a user to interact with a social agent. Examples of goals include the acquisition of information, arrival at a particular destination, or viewing or participating in an event, to name a few. Furthermore, because it is not possible to have definite knowledge of a human user's inner mental state, as used in the present application the term goal is to be interpreted as "inferred goal." Thus, as used herein, the "goal of the user" refers to the "inferred goal of the user."

Furthermore, as defined in the present application, the terms "automation," "automated," and "automating" refer to systems and processes that do not require human intervention. Although in some implementations a human editor may review the personalized responses generated by the systems and using the methods described herein, that human involvement is optional. Thus, the methods described in the present application may be performed under the control of hardware processing components of the disclosed automated systems.

In addition, as defined in the present application, the term "social agent" refers to a non-human communicative entity rendered in hardware and software that is designed for expressive interaction with a human user. In some use cases, a social agent may take the form of a virtual character rendered on a display (i.e., social agent 116*a* rendered on display 158 of client system 150, in FIG. 1) and appearing to watch and listen to a user in order to respond to a communicative user input. In other use cases, a social agent may take the form of a machine (i.e., social agent 116*b*, in FIG. 1), such as a robot for example, appearing to watch and listen to the user in order to respond to a communicative user input. Alternatively, a social agent may be implemented as an automated voice response (AVR) system, or an interactive voice response (IVR) system, for example.

Figure 1:
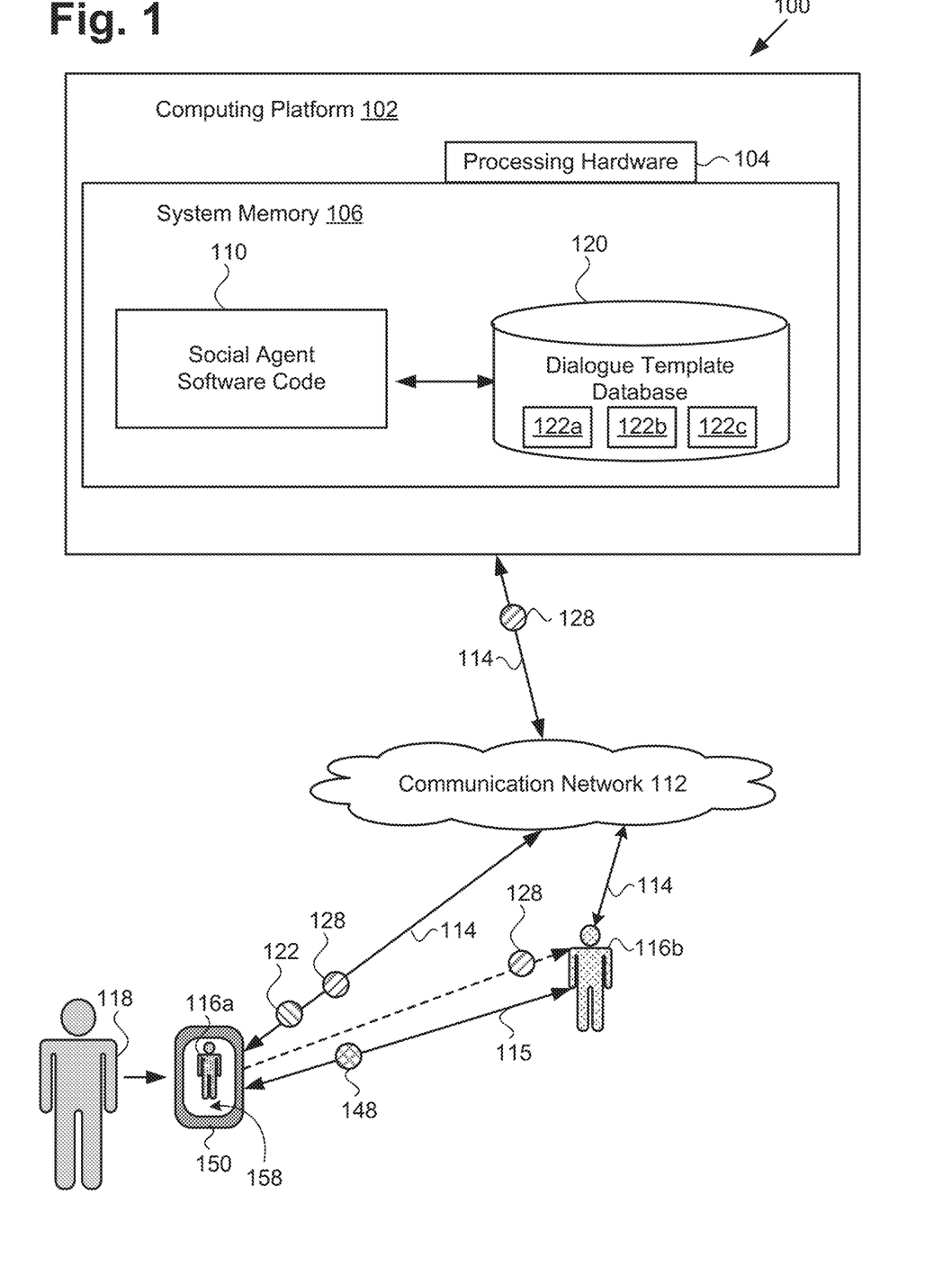
FIG. 1 shows a diagram of a social agent system, according to one exemplary implementation.

FIG. 1 shows a diagram of a social agent system, according to one exemplary implementation. As shown in FIG. 1, social agent system 100 (hereinafter "system 100") includes computing platform 102 having processing hardware 104 and system memory 106 implemented as a non-transitory storage medium. According to the present exemplary implementation, system memory 106 stores social agent software code 110 and dialogue template database 120 storing dialogue templates 122a, 122b, and 122c (hereinafter "dialogue templates 122a-122c"). In addition, FIG. 1 shows social agents 116a and 116b shown respectively as a virtual character and a physical machine such as a robot.

As further shown in FIG. 1, system 100 is implemented within a use environment including communication network 112 providing network communication links 114, as well as client system 150 including display 158 and utilized by user 118 to interact with system 100. Also shown in FIG. 1 are input data 128 corresponding to an interaction by user 118 with social agent 116a or 116b, selected dialogue template 122 from among dialogue templates 122a-122c delivered to client system 150 by system 100, personalized dialogue 148, created by client system 150 using selected dialogue template 122, and optional wireless communication link 115 between client system 150 and social agent 116b.

Although the present application may refer to one or both of social agent software code 110 and dialogue template database 120 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts social agent software code 110 and dialogue template database 120 as being co-located in system memory 106, that representation is also merely provided as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100.

Processing hardware 104 may include multiple hardware processing units, such as one or more central processing units, one or more graphics processing units, one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

It is noted that, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Moreover, in some implementations, communication network 112 may be a high-speed network suitable for high performance computing (HPC), for example a 10 GigE network or an Infiniband network.

Although client system 150 is shown as a smartphone in FIG. 1, that representation is provided merely as an example as well. More generally, client system 150 may be any suitable mobile or stationary computing device or system that includes display 158, provides a user interface, supports communications via communication network 112 and wireless communication link 115, and implements data processing capabilities sufficient to implement the functionality ascribed to client system 150 herein. For example, in other implementations, client system 150 may take the form of a tablet computer, laptop computer, desktop computer, smart television (smart TV), game console, or a smart wearable device, such as a smartwatch, for instance. With respect to display 158 of client system 150, display 158 may be implemented as a liquid crystal display (LCD), light-emitting diode (LED) display, organic light-emitting diode (OLED) display, quantum dot (QD) display, or any other suitable display screen that perform a physical transformation of signals to light.

By way of overview of the functionality of social agent system 100 and client system 150, in a typical use case, social agent system 100 may receive, from client system 150, input data 128 provided by user 118 of the client system 150 when user 118 is interacting with social agent system 100 using client system 150. Processing hardware 104 of computing platform 102 may execute social agent software code 110 to select, using input data 128, one of dialogue templates 122a-122b (i.e., selected dialogue template 122) for responding to user 118. Selected dialogue template 122, as well as dialogue templates 122a-122c, each includes one or more placeholder fields to be filled by client system 150 using user data stored on client system 150 and inaccessible to social agent system 100, to create a personalized dialogue for responding to user 118. Social agent system 100 may then deliver, to client system 150, selected dialogue template 122 including the one or more placeholder fields to be filled by client system 150 to create personalized dialogue 148, using selected dialogue template 122.

Client system 150 may receive selected dialogue template 122 from social agent system 100, and may identify user data stored locally on client system 150 for filling the one or more placeholder fields included in selected dialogue template 122. Client system may then fill the one or more placeholder fields using the user data to create personalized dialogue 148 for responding to user 118, and may execute the personalized dialogue, using one or more output devices of client system 150, such as display 158, or using wireless communication link 115 to control output devices of social agent 116b.

Figure 2:
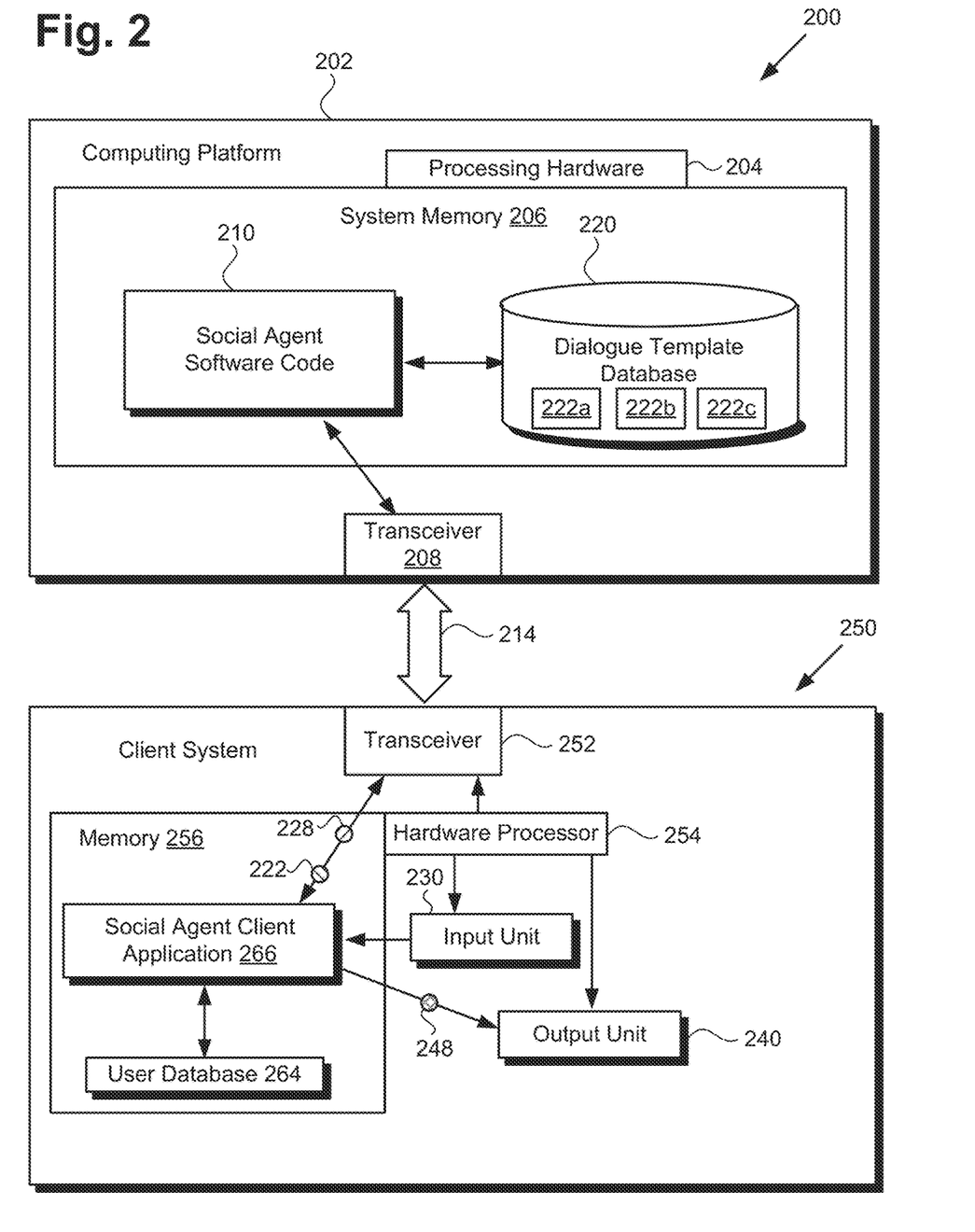
FIG. 2 shows a diagram including a more detailed exemplary representation of a user system in interaction with the social agent system shown in FIG. 1, according to one implementation.

FIG. 2 shows a more detailed representation of exemplary client system 250 in combination with computing platform 202 of social agent system 200, according to one implementation. As shown in FIG. 2, client system 250 is communicatively coupled to computing platform 202 by network communication link 214. Computing platform 202 includes processing hardware 204, system memory 206 implemented as a non-transitory storage medium, and transceiver 208. According to the exemplary implementation depicted in FIG. 2, system memory 206 stores social agent software code 210 and dialogue template database 220 including exemplary dialogue templates 222a, 222b, and 222c (hereinafter "dialogue templates 222a-222c").

Client system 250 includes hardware processor 254 and memory 256 implemented as a non-transitory storage medium storing user database 264 and social agent client application 266. As also shown in FIG. 2, client system 250 may include any or all of transceiver 252, input unit 230, and output unit 240 receiving personalized dialogue 248 from social agent client application 266. Also shown in FIG. 2 are input data 228 generated by client system 250 and received by social agent system 200 via network communication link 214, and selected dialogue template 222 delivered to client device 250 by social agent system 200, also via network communication link 214.

Social agent system 200 including computing platform 202 having processing hardware 204 and system memory 206 storing dialogue template database 220 including dialogue templates 222a-222c corresponds in general to social agent system 100 including computing platform 102 having processing hardware 104 and system memory 106 storing dialogue template database 120 including dialogue templates 122a-122c, in FIG. 1. Thus, social agent system 200 may share any of the characteristics attributed to social agent system 100 by the present disclosure, and vice versa. That is to say, although not shown in FIG. 1, like social agent system 200, social agent system 100 may include transceiver 208.

In addition, social agent software code 210 corresponds in general to social agent software code 110, in FIG. 1. Consequently, social agent software code 110 may share any of the characteristics attributed to social agent software code 210 by the present disclosure, and vice versa. Moreover, input data 228, selected dialogue template 222, personalized dialogue 248, and network communication link 214, in FIG. 2, correspond respectively in general to input data 128, selected dialogue template 122, personalized dialogue 148, and network communication links 114, in FIG. 1, and those corresponding features may share any of the characteristics attributed to either corresponding feature herein.

Client system 250 corresponds in general to client system 150, and those corresponding features may share any of the characteristics attributed to either corresponding feature by the present disclosure. Thus, like client system 250, client system 150 may include features corresponding to hardware processor 254, input unit 230, output unit 240, transceiver 252, and memory 256 storing user database 264 and social agent client application 266. It is noted that display 158 of client system 150 may be included as a component of one or both of input unit 230 and output unit 240.

Transceiver 208 and transceiver 252 may be implemented as wireless communication hardware and software enabling computing platform 102/202 of social agent system 100/200 to exchange data with client system 150/250 via network communication link 114/214. For example, transceiver 208 and transceiver 252 may be implemented as fourth generation of broadband cellular technology (4G) wireless transceivers, or as 5G wireless transceivers configured to satisfy the IMT-2020 requirements established by the International Telecommunication Union (ITU). Alternatively, or in addition, transceiver 208 and transceiver 252 may be configured to communicate via one or more of the Wireless Fidelity (Wi-Fi) family of wireless network protocols based on the Institute of Electrical and Electronics Engineers (IEEE®) 802.11 family of standards, Bluetooth®, ZigBee®, and 60 GHz wireless communications methods.

With respect to social agent client application 266, it is noted that social agent client application 266 may be a client application of social agent software code 110/210. It is noted that, in some implementations, one or both of social agent software code 110/210 and social agent client application 266 may include one or more machine learning models, such as NNs, for example. Social agent client application 266 is configured to create personalized dialogue 148/248 for user 118 by filling one or more placeholder fields included in selected dialogue template 122/222, selected by social agent software code 110/210, utilizing user data obtained from user database 264. According to various implementations of the present disclosure, social agent client application 266 enables user 118 to selectively restrict access to the user data stored locally on client system 150/250 by social agent system 100/200, while advantageously enabling use of that restricted user data to create personalized dialogue 148/248 from selected dialogue template 122/222.

According to the exemplary implementation shown in FIG. 2, social agent client application 266 is located in memory 256 of client system 150/250, subsequent to transfer of social agent client application 266 to client system 150/250 over a packet-switched network, such as the Internet, for example. Once present on client system 150/250, social agent client application 266 may be persistently stored in memory 256 and may be executed locally on client system 150/250 by hardware processor 254.

Figure 3A:
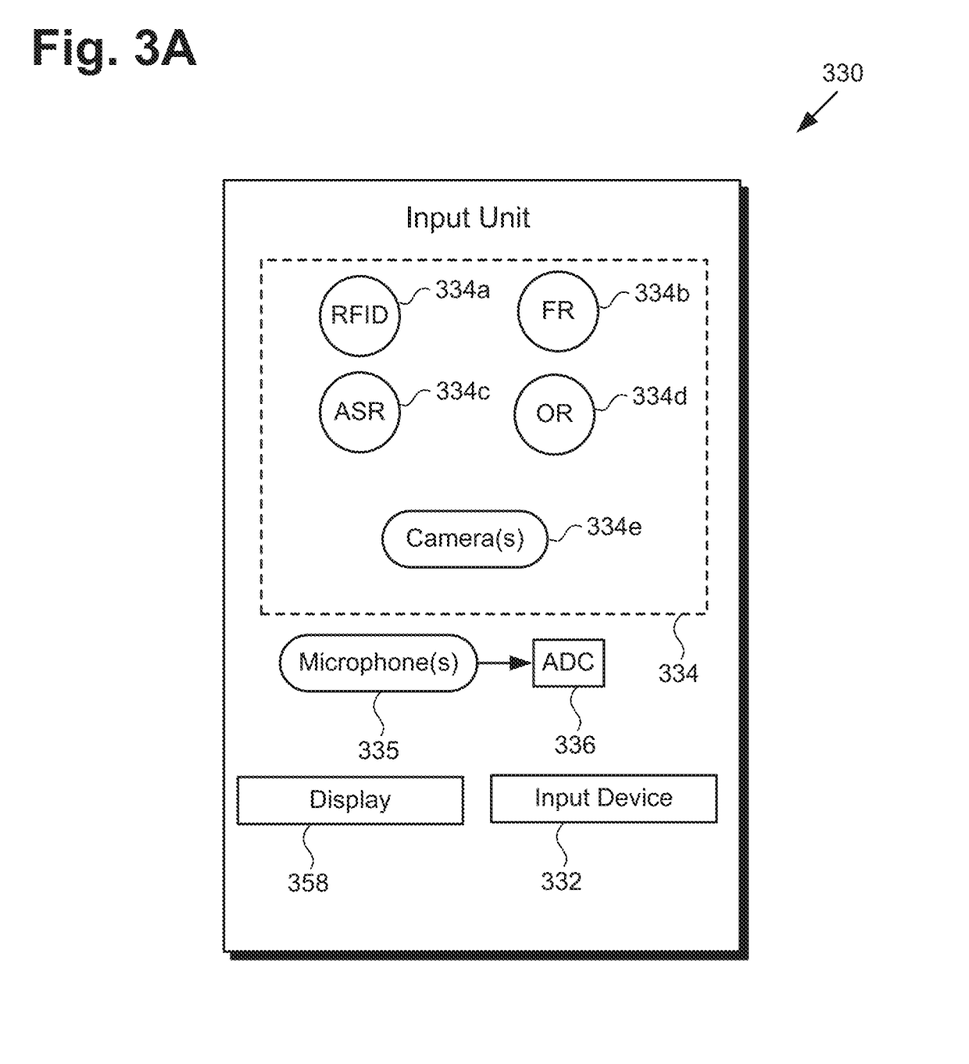
FIG. 3A shows a more detailed diagram of an input unit suitable for use in an interaction with the social agent system shown in FIGS. 1 and 3, according to one implementation.

FIG. 3A shows a more detailed diagram of input unit 330, according to one implementation. As shown in FIG. 3A, input unit 330 includes input device 332 such as a keyboard, trackpad, or mouse, for example, sensors 334, one or more microphones 335 (hereinafter "microphone(s) 335"), analog-to-digital converter (ADC) 336, and may include display 358 in the form of a touchscreen. As further shown in FIG. 3A, sensors 334 of input unit 330 may include radio-frequency identification (RFID) sensor 334a, facial recognition (FR) sensor 334b, automatic speech recognition (ASR) sensor 334c, object recognition (OR) sensor 334d, and one or more cameras 334e (hereinafter "camera(s) 334e"). Input unit 330 corresponds in general to input unit 230, in FIG. 2. Thus, input unit 230 and may share any of the characteristics attributed to input unit 330 by the present disclosure, and vice versa.

It is noted that the specific sensors shown to be included among sensors 334 of input unit 230/330 are merely exemplary, and in other implementations, sensors 334 of input unit 230/330 may include more, or fewer, sensors than RFID sensor 334a, FR sensor 334b, ASR sensor 334c, OR sensor 334d, and camera(s) 334e. Moreover, in other implementations, sensors 334 may include a sensor or sensors other than one or more of RFID sensor 334a, FR sensor 334b, ASR sensor 334c, OR sensor 334d, and camera(s) 334e. It is further noted that camera(s) 334e may include various types of cameras, such as red-green-blue (RGB) still image and video cameras, RGB-D cameras including a depth sensor, and infrared (IR) cameras, for example.

Figure 3B:
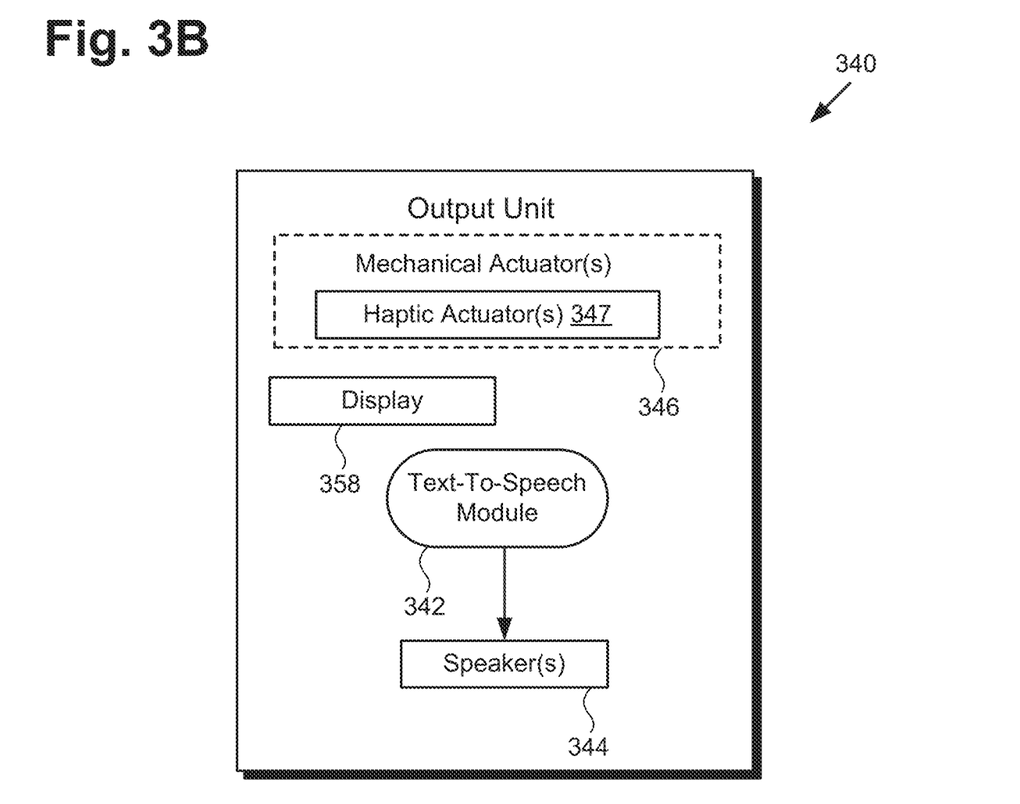
FIG. 3B shows a more detailed diagram of an output unit suitable for use in an interaction with the social agent system shown in FIGS. 1 and 3, according to one implementation.

FIG. 3B shows a more detailed diagram of output unit 340, according to one implementation. As shown in FIG. 3B, output unit 340 includes display 358, Text-To-Speech (TTS) module 342 and one or more audio speakers 344 (hereinafter "audio speaker(s) 344"). As further shown in FIG. 3B, in some implementations, output unit 340 may include one or more mechanical actuators 346 (hereinafter "mechanical actuator(s) 346"), which may include one or more haptic actuators 347 (hereinafter "haptic actuator(s) 347"). It is noted that, when included as a component or components of output unit 340, mechanical actuator(s) 346 may be used to produce facial expressions by social agent 116b, and to articulate one or more limbs or joints of social agent 116b.

Output unit 340 corresponds in general to output unit 240, in FIG. 2. Thus, output unit 240 may share any of the characteristics attributed to output unit 340 by the present disclosure, and vice versa. Moreover, display 358 shown in FIGS. 3A and 3B corresponds in general to display 158, in FIG. 1. Thus, like display 158, display 358 may take the form of an LCD, LED display, OLED display, QD display, or any other suitable display screen that perform a physical transformation of signals to light.

It is noted that the specific components shown to be included in output unit 240/340 are merely exemplary, and in other implementations, output unit 240/340 may include more, or fewer, components than display 208, TTS module 342, audio speaker(s) 344, and mechanical actuator(s) 346. Moreover, in other implementations, output unit 240/340 may include a component or components other than one or more of display 208, TTS module 342, audio speaker(s) 344, and mechanical actuator(s) 346. It is further noted that in implementations in which social agent 116b takes the form of a robot or other type of physical machine, an output unit corresponding to output unit 240/340 may be integrated with social agent 116b, as well as with client system 150/250. In other words, in some implementations, social agent 116b may include output unit 240/340.

Figure 4:
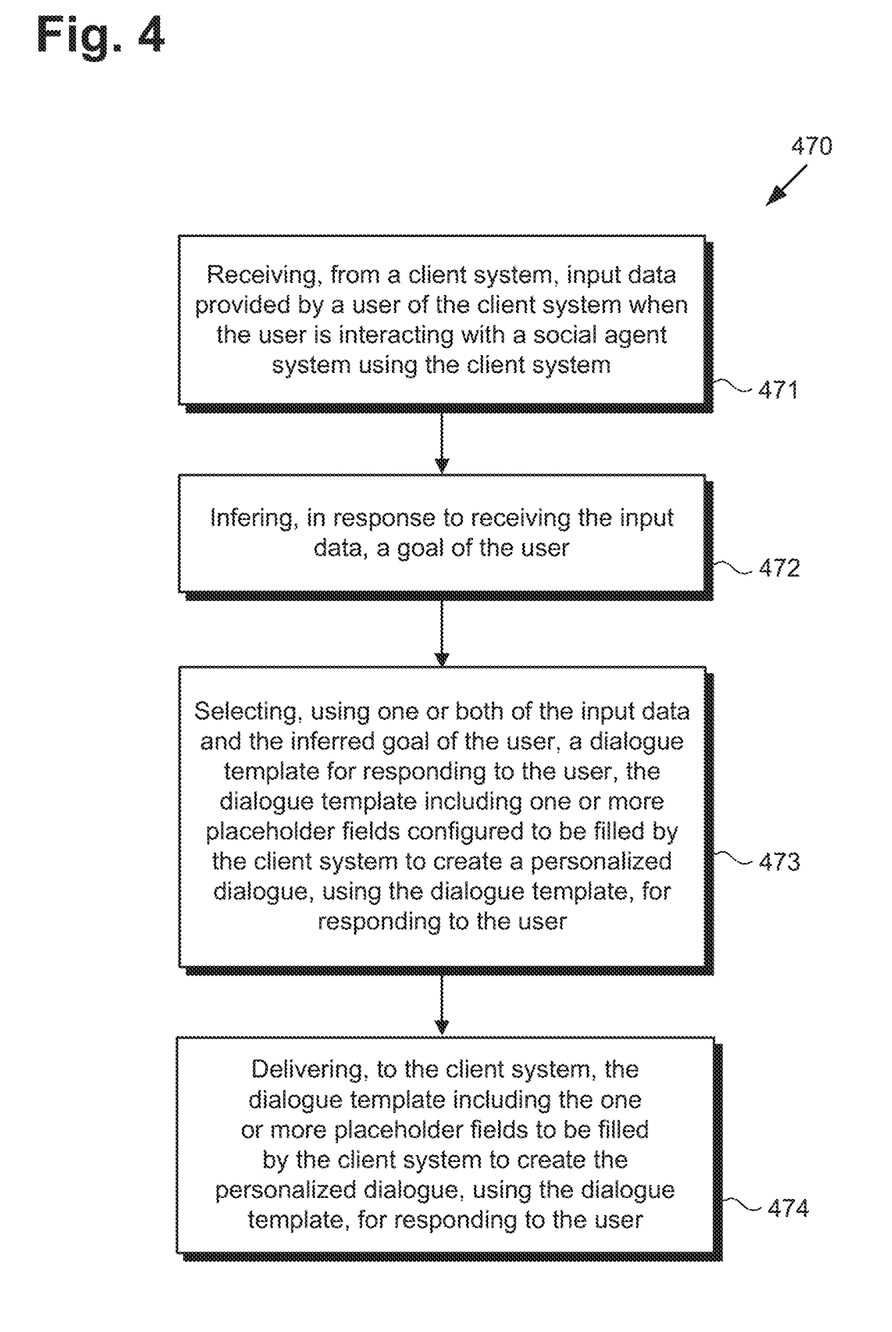
FIG. 4 shows a flowchart presenting an exemplary method for use by a social agent system to interact with a user, according to one implementation.
Figure 5:
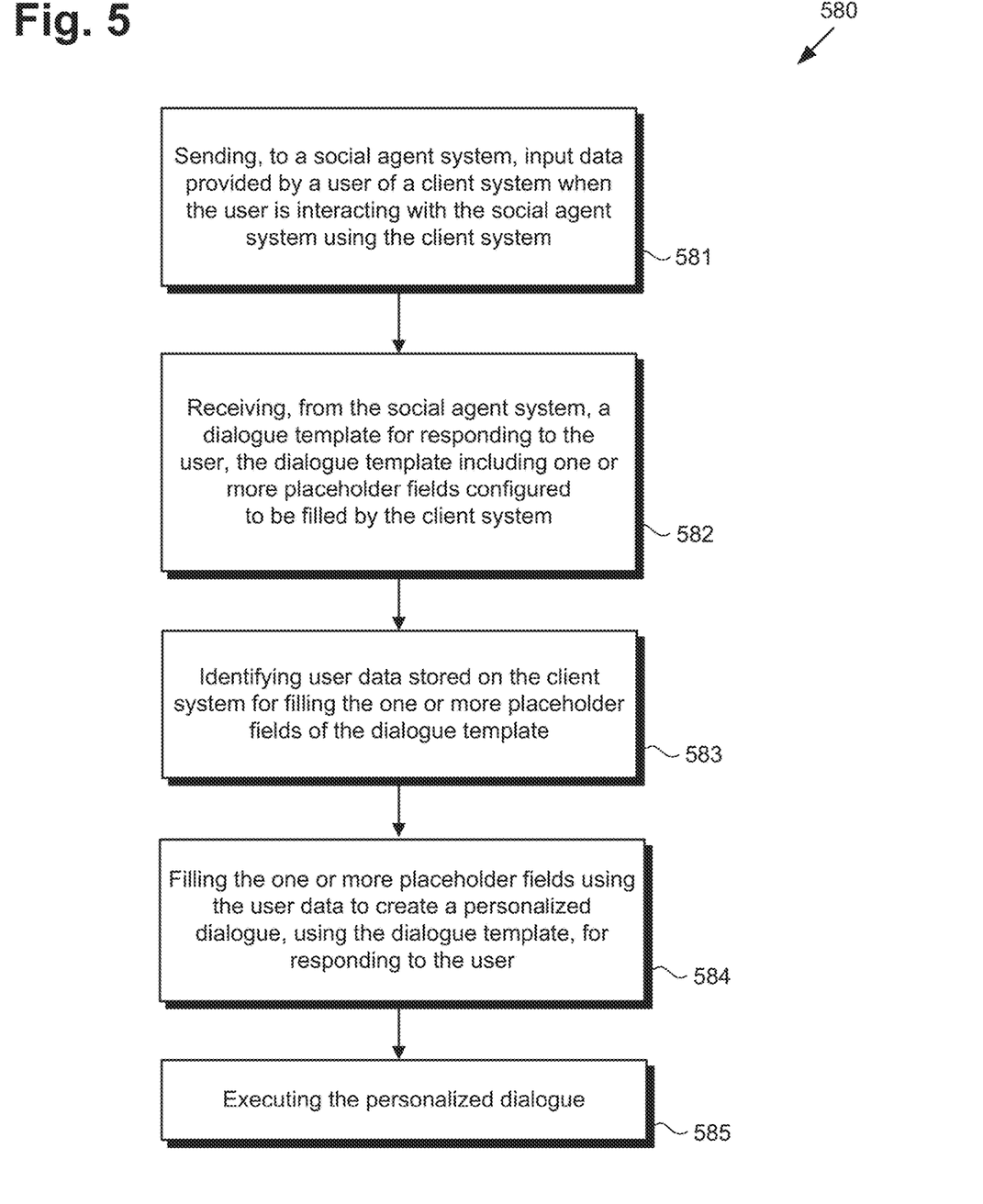
FIG. 5 shows a flowchart presenting an exemplary method for execution by a social agent client application, according to one implementation.

The functionality of social agent software code 110/210 and social agent client application 266 is further described below by reference to FIGS. 4 and 5. FIG. 4 shows flowchart 470 presenting an exemplary method for use by social agent system 100/200 to interact with user 118, according to one implementation, while FIG. 5 shows flowchart 580 presenting an exemplary method for execution by a social agent client application, according to one implementation. With respect to the actions outlined in FIGS. 4 and 5, it is noted that certain details and features have been left out of respective flowchart 470 and flowchart 580 in order not to obscure the discussion of the inventive features in the present application.

Referring to FIG. 4 in combination with FIGS. 1 and 2, flowchart 470 begins with receiving, from client system 150/250, input data 128/228 provided by user 118 of client system 150/250 when user 118 is interacting with social agent system 100/200 using client system 150/250 (action 471). Input data 128/228 may be received by social agent software code 110/210, executed by processing hardware 104/204 of computing platform 102/202, via communication network 112 and network communication links 114/214. Input data 128/228 may be received in the form of speech or text by user 118 in interacting with social agent 116a or 116b, for example.

Alternatively, or in addition, input data 128/228 may be received in the form of one or more non-verbal expressions by user 118 in interacting with social agent 116a or 116b. As noted above, the term non-verbal expression may refer to vocalizations that are not language based, i.e., non-verbal vocalizations, as well as to physical gestures and physical postures.

Examples of non-verbal vocalizations may include a sigh, a murmur of agreement or disagreement, or a giggle, to name a few. Alternatively, input data 128/228 may be received as speech uttered by user 118, or as one or more manual inputs to input device 332 in the form of a keyboard or touchscreen, for example, by user 118. Thus, the interaction with social agent system 110/200 by user 118 using client system 150/250 may include one or more of text input by user 118, speech by user 118, a non-verbal vocalization by user 118, a facial expression by user 118, a gesture by user 118, or a physical posture of user 118.

According to various implementations, client system 150/250 advantageously includes input unit 230/330, which may obtain video and perform motion capture, using camera(s) 334e for example, in addition to capturing audio using microphone(s) 335. As a result, social agent client application 266, when executed by hardware processor 254 of client system 150/250, may receive audio, video, and motion capture features from input unit 230/330, and may detect a variety of verbal and non-verbal expressions by user 118 in an with social agent system 100/200 using client system 150/250. Input data 128/228 may then be conveyed to social agent system 100/200.

In some implementations, as shown in FIG. 4, flowchart 470 may further include inferring, in response to receiving input data 128/228, a goal of user 118 (action 472). For example, based on a verbal expression, a non-verbal expression, or a combination of verbal and non-verbal expressions described by input data 128/228, processing hardware 104/204 may execute social agent software code 110/220 to determine a goal of user 118, for example, using a machine learning predictive model included in social agent software code 110/210. The goal of user 118 may be determined based on the subject matter of the interaction described by input data 128/228. As noted above, the term goal refers to the aim or objective motivating user 118 to interact with social agent system 100/200, and may include the acquisition of information, arrival at a particular destination, or viewing or participating in an event, to name a few examples.

Flowchart 470 further includes selecting, using at least input data 128/228, one of dialogue templates 122a-122c/222a-222c for responding to user 118, the selected dialogue template 122/222 including at least one placeholder field configured to be filled by client system 150/250 to create personalized dialogue 148/248, using the selected dialogue template 122/222, for responding to user 118 (action 473). Thus, selected dialogue template 122/222 is selected in action 473 from among multiple predetermined dialogue templates 122a-122c/222a-222c. Action 473 may be performed by social agent software code 110/210, executed by processing hardware 104/204 of computing platform 102/202.

It is noted that, in some implementations, the method outlined by flowchart 470 may omit action 472, and action 473 may follow directly from action 471. In those implementations, action 473 may be performed using input data 128/228 alone. However, in implementations in which action 472 is performed, action 473 may include using the inferred goal of user 118, as well as input data 128/228, to select the dialogue template for use in responding to user 118.

Flowchart 470 further includes delivering, to client system 150/250, selected dialogue template 122/222 including the at least one placeholder field to be filled by client system 150/250 to create personalized dialogue 148/248, using selected dialogue template 122/222, for responding to user 118 (action 474). Action 474 may be performed by social agent software code 110/210, executed by processing hardware 104/204 of computing platform 102/202, as a result of communication with client system 150/250 via communication network 112 and network communication links 114/214.

By way of example, dialogue template 122/222 selected in action 473 may include the following greeting: "Hi there (name placeholder field). How are things going in (location placeholder field)?" The user data for filling the name and location placeholder fields in this exemplary dialogue template may not be available to social agent system 100/200 due to that user data being selectably rendered inaccessible to social agent system 100/200 by user 118 through use of social agent client application 266. As a result, that user data may be sequestered on client system 150/250 and may be used locally on client system 150/250 by social agent client application 266 in action 474 to create personalized dialogue 148/248, using selected dialogue template 122/222, for responding to user 118. For instance, where user 118 is named Mary Clark and Mary is located in Santa Clarita, California, personalized dialogue 148/248 based on selected dialogue template 122/222 may state: "Hi there (Mary). How are things going in (Santa Clarita)?"

In some implementations, the privacy level restricting access to the user data stored in user database 264 of client system 150/250 may be predetermined and fixed. For example, in some of those implementations, the user data stored in user database 264 may include personally identifiable information (PII) of user 118, and social agent client application 266 may be configured to make all PII unavailable to social agent system 100/200. However, in other implementations, it may be advantageous or desirable to enable user 118 to control their preferred level of privacy by selecting that privacy level from multiple predetermined alternative privacy levels using social agent client application 266. For example, in one implementation, one user controllable privacy level may make all user data stored in user database 264 available to social agent system 100/200, while another user controllable privacy level may not make any user data available to social agent system 100/200. One or more user selectable intermediate privacy levels may partially anonymize the user data made available to social agent system 100/200. By way of example, where user 118 is twenty-five year old Mary Clark in Santa Clarita, Mary may control her privacy level using social agent client application 266 by selecting an intermediate privacy level allowing social agent system 100/200 to obtain user data describing Mary as an adult female user in California, or as a female user in the United States.

In some implementations, social agent client application 266 may be configured to partially anonymize user data other than PII, using a proto-object as a proxy for a famous or otherwise identifiable object favored by user 118. That is to say, the proto-object corresponds to a preference of user 118. For example, where a favorite character of user 118 is a world famous animated mouse, social agent client application 266 may make user data describing user 118 as having a favorite mouse character available to social agent system 100/200 without identifying the famous animated mouse per se.

Moving to FIG. 5, and Referring to flowchart 580 in combination with FIGS. 1 and 2, flowchart 580 begins with sending, to social agent system 100/200 including social agent software code 110/210, input data 128/228 provided by user 118 of client system 150/250 when user 118 is interacting with social agent system 1100/200 using client system 150/250 (action 581). Input data 128/228 may be sent to social agent system 100/200 by social agent client application 266, executed by hardware processor 254 of client system 150/250, via communication network 112 and network communication links 114/214. Input data 128/228 may be received in the form of speech or text by user 118 in interacting with social agent 116a or 116b, for example. Input data 128/228 may be collected and conveyed in the manner discussed above by reference to action 471 of flowchart 470.

Flowchart 580 further includes receiving, from social agent system 100/200, dialogue template 122/222 for responding to user 118, dialogue template 122/222 including at least one placeholder field configured to be filled by client system 150/250 (action 582). As noted above, dialogue template 122/222 is selected in action 473 described above by social agent software code 110/210 of social agent system 100/200 from among multiple predetermined dialogue templates 122a-122c/222a-222c. Selected dialogue template 122/222 may be received in action 582 by social agent client application 266, executed by hardware processor 254 of client system 150/250, via communication network 112 and network communication links 114/214.

Flowchart 580 further includes identifying user data stored on client system 150/250 for filling the one or more placeholder fields included in selected dialogue template 122/222 (action 583). For example, the user data for filling the one or more placeholder fields included in selected dialogue template 122/222 may be identified by searching user database 264 on client system 150/250. That user data may be identified and obtained from user database 264 in action 583 by social agent client application 266, executed by hardware processor 254 of client system 150/250.

Flowchart 580 further includes filling the one or more placeholder fields included in selected dialogue template 122/222 using the user data identified in action 583 to create personalized dialogue 148/248, using selected dialogue template 122/222, for responding to user 118 (action 584). Action 584 may be performed by social agent client application 266, executed by hardware processor 254 of client system 150/250, in the manner described above by reference to action 474.

Flowchart 580 can continue and conclude with executing personalized dialogue 148/248 (action 585). Execution of personalized dialogue 148/248 may be performed by social agent client application 266, executed by hardware processor 254 of client system 150/250, in a number of different ways, as described below.

In some implementations, personalized dialogue 148/248 may take the form of language based verbal communication by social agent 116a. Moreover, in some implementations, output unit 240/340 may include display 158/358. In those implementations, personalized dialogue 148/248 may be executed by being rendered as text on display 158/358 of client system 150/250.

However, in other implementations personalized dialogue 148/248 may include a non-verbal communication by social agent 116a, either instead of, or in addition to a language based communication. For example, in some implementations, output unit 240/340 may include TTS module 342 and speaker(s) 344, as well as display 158/358 showing social agent 116a in the form of a virtual character, such as an avatar or animation, for example. In those implementations, personalized dialogue 148/248 may be executed by being output as speech by the virtual character using speaker(s) 344 of client system 150/250. In addition, in some implementations, personalized dialogue 148/248 may include a non-verbal vocalization by the virtual character, a facial expression by the virtual character, a gesture by the virtual character, or a physical posture adopted by the virtual character. Alternatively, or in addition, in some implementations, personalized dialogue 148/248 may be accompanied by a haptic effect. In those implementations, executing personalized dialogue 148/248 in action 585 may include activating haptic actuator(s) 347 of client system 150/250.

Furthermore, and as shown in FIG. 1, in some implementations, social agent system 100/200 may include social agent 116b in the form of a robot or other physical machine capable of simulating expressive behavior and including output unit 240/340. In those implementations, personalized dialogue 148/248 may be rendered as one or more of speech by social agent 116b, a non-verbal vocalization by social agent 116b, a facial expression by social agent 116b, a gesture by social agent 116b, or a physical posture adopted by social agent 116b, under the control of client system 150/250.

For example, in some implementations, hardware processor 254 of client system 150/250 may execute social agent client application 266 to utilize transceiver 252 to establish wireless communication link 115 with social agent 116b, such as a 4G or 5G wireless communication link, or a wireless communication link implemented using WI-FI®, BLUETOOTH®, ZIGBEE®, or 60 GHz wireless communications methods, for instance. In those implementations, execution of personalized dialogue 148/248 in action 585 may include wirelessly controlling social agent 116b, by client system 150/250, to speak, via speaker(s) 344, or to move in response to activation of mechanical actuator(s) 346 by client system 150/250.

Thus, the present application is directed to systems and methods for personalizing a user interaction with a social agent that address and overcome the deficiencies in the conventional. The inventive concepts disclosed in the present application advantageously enable the determination of naturalistic expressions for use by a social agent in responding to an interaction with a user, while concurrently enabling the user to selectively sequester their personal user data from the system providing the social agent. Moreover, the present solution may advantageously be implemented as automated systems and methods. That is to say, actions 471, 472, and 474, or actions 471, 472, 473, and 474 in FIG. 4, and actions 581, 582, 583, 584, and 585 in FIG. 5, may be performed in automated processes from which human involvement may be omitted.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A social agent system comprising:
   a computing platform including a processing hardware and a system memory;
   a social agent software code stored in the system memory, the social agent software code including a machine learning predictive model;
   the processing hardware configured to execute the social agent software code to:
      receive, from a client system storing a social agent client application of the social agent software code, input data provided by a user of the client system, the input data including a non-verbal vocalization by the user while the user is interacting with a social agent provided by the social agent system, wherein the social agent is embodied as one of a physical machine configured to be wirelessly controlled by the client system or a virtual character comprising an avatar or an animation rendered on a display of the client system, and wherein the social agent appears to watch and listen to the user in order to respond to the user based on the input data provided by the user;
      infer, using the machine learning predictive model and the input data, a goal of the user;
      select, using the input data and the goal of the user, a dialogue template for responding to the user, the dialogue template including at least one placeholder field configured to be filled by the client system to create a personalized dialogue, using the dialogue template, for responding to the user;
      deliver, to the client system, the dialogue template;
      wherein a user data used to fill the at least one placeholder field is inaccessible to the social agent system based on a user data access restriction selected by the user using the social agent client application; and
      wherein the social agent is configured to execute the personalized dialogue accompanied by a haptic effect activated by a haptic actuator of the client system or the physical machine.

2. The social agent system of claim 1, wherein the input data further includes one of speech or text.

3. The social agent system of claim 1, wherein the input data identifies a proto-object serving as a proxy for an object favored by the user.

4. The social agent system of claim 1, further comprising the physical machine configured to be wirelessly controlled by the client system to provide the personalized dialogue to the user, wherein the personalized dialogue is one of speech or text.

5. The social agent system of claim 1, wherein the non-verbal vocalization comprises at least one of a sigh, a murmur of agreement, a murmur of disagreement, or a giggle.

6. A method for use by a social agent system including a computing platform having a processing hardware and a system memory storing a social agent software code, the social agent software code including a machine learning predictive model, the method comprising:

receiving from a client system storing a social agent client application of the social agent software code, by the social agent software code executed by the processing hardware, input data provided by a user of the client system, the input data including a non-verbal vocalization by the user while the user is interacting with the social agent, wherein the social agent is embodied as one of a physical machine configured to be wirelessly controlled by the client system or a virtual character comprising an avatar or an animation rendered on a display of the client system, and wherein the social agent appears to watch and listen to the user in order to respond to the user based on the input data provided by the user;

inferring, by the social agent software code executed by the processing hardware and using the machine learning predictive model and the input data, a goal of the user;

selecting, by the social agent software code executed by the processing hardware and using the input data and the goal of the user, a dialogue template for responding to the user, the dialogue template including at least one placeholder field configured to be filled by the client system to create a personalized dialogue, using the dialogue template, for responding to the user;

delivering to the client system, by the social agent software code executed by the processing hardware, the dialogue template;

wherein a user data used to fill the at least one placeholder field is inaccessible to the social agent system based on a user data access restriction selected by the user using the social agent client application; and wherein the social agent is configured to execute the personalized dialogue accompanied by a haptic effect activated by a haptic actuator of the client system or the physical machine.

7. The method of claim 6, wherein the input data further includes one of speech or text.

8. The method of claim 6, wherein the input data identifies a proto-object object serving as a proxy for an object favored by the user.

9. The method of claim 8, wherein the user data comprises personally identifiable information (PII) of the user.

10. The method of claim 6, wherein the non-verbal vocalization comprises at least one of a sigh, a murmur of agreement, a murmur of disagreement, or a giggle.

11. A computer-readable non-transitory medium having stored thereon a social agent client application, which when executed by a hardware processor of a client system, instantiates a method comprising:

sending, to a social agent system including a social agent software code including a machine learning predictive model, input data provided by a user of the client system when the user is interacting with a social agent provided by the social agent system, the input data including a non-verbal vocalization by the user during the interacting, wherein the social agent is embodied as one of a physical machine configured to be wirelessly controlled by the client system or a virtual character comprising an avatar or an animation rendered on a display of the client system, and wherein the social agent appears to watch and listen to the user in order to respond to the user based on the input data provided by the user;

receiving, from the social agent system, a dialogue template for responding to the user, the dialogue template including at least one placeholder field configured to be filled by the client system wherein the dialogue template is selected by the social agent software code using at least one of the input data or-a goal of the user inferred by the social agent software code using the machine learning predictive model based on the input data;

identifying user data stored on the client system for filling the at least one placeholder field, the user data being inaccessible to the social agent system based on a user data access restriction selected by the user using the social agent client application;

filling the at least one placeholder field using the user data to create a personalized dialogue, using the dialogue template, for responding to the user; and executing the personalized dialogue;

wherein the personalized dialogue is accompanied by a haptic effect, and wherein executing the personalized dialogue comprises activating a haptic actuator of the client system or the physical machine.

12. The computer-readable non-transitory medium of claim 11, wherein the dialogue template is selected from one of a plurality of predetermined dialogue templates.

13. The computer-readable non-transitory medium of claim 11, wherein the input data identifies a proto-object corresponding to an object favored by the user.

14. The computer-readable non-transitory medium of claim 13, wherein the user data comprises personally identifiable information (PII) of the user.

15. The computer-readable non-transitory medium of claim 11, wherein the personalized dialogue comprises text, and wherein executing the personalized dialogue comprises rendering the text on the display of the client system.

16. The computer-readable non-transitory medium of claim 11, wherein the personalized dialogue comprises speech, and wherein executing the personalized dialogue comprises outputting the speech using a speaker of the client system.

17. The computer-readable non-transitory medium of claim 11, wherein the personalized dialogue comprises at least one of speech or movement by the virtual character, and wherein executing the personalized dialogue comprises rendering the virtual character performing the at least one of the speech or the movement on the display of the client system.

18. The computer-readable non-transitory medium of claim 11, wherein the personalized dialogue comprises at least one of speech or movement by the physical machine, the method further comprising:

establishing a wireless communication link with the physical machine;

wherein executing the personalized dialogue comprises wirelessly controlling the physical machine to perform the at least one of the speech or the movement.

19. The computer-readable non-transitory medium of claim 18, wherein the physical machine comprises a robot.

* * * * *